May 3, 1949.  E. C. WAHLBERG  2,469,140
SYNCHRONIZING SYSTEM FOR GEARED MOTORS
Filed July 2, 1945

INVENTOR.
Eric C Wahlberg
BY Thomas C. Betts

Patented May 3, 1949

2,469,140

UNITED STATES PATENT OFFICE 2,469,140

SYNCHRONIZING SYSTEM FOR GEARED MOTORS

Eric C. Wahlberg, Stamford, Conn., assignor to Electrolux Corporation, Old Greenwich, Conn., a corporation of Delaware Application July 2, 1945, Serial No. 602,785

6 Claims. (Cl. 318—85)

My invention relates to an electric system and more particularly to a system including a plurality of preferably synchronous electric motors, each driving a gear reduction unit. In certain applications of such a system, such as for driving scanning discs in television and radar equipment, it is essential that the output shafts of the several gear units not only be driven in synchronism with each other, but also start from certain predetermined angular positions with respect to each other.

In my Patents No. 2,399,272 and No. 2,399,273, both granted on April 30, 1946, as well as in Patent No. 2,360,856, granted October 24, 1944 to F. C. Doughman and myself, there are shown systems including a plurality of electric motors with means for causing the motor shafts to be angularly positioned before starting, and to start, run and stop in synchronism. Such a system would be ideal for operating scanning discs, provided the discs could be directly driven by the motor shafts without any gear reduction, inasmuch as the shafts may be angularly aligned before the motors are started. However, the low speed at which it is necessary to rotate scanning discs makes it impractical to drive them directly, and hence, gear reduction units are necessary, and if the armature shaft of one motor makes a different number of revolutions than the shafts of the other motors, the output shafts of the gear units will not be in proper angular alignment, even though the armature shafts themselves are properly aligned.

It has been found in practice that, with motors of this type, the shaft of one motor may occasionally during stopping make one revolution more or less than the shafts of the other motors. For most applications where direct drive is possible this is of no importance, inasmuch as the shafts are brought into proper alignment each time the motors are started, and even for applications involving gear reductions, it usually is of but minor moment, because the occasional over or under runs of one revolution are apt to compensate and cancel out rather than accumulate, and hence if absolute angular positioning of the output shafts at all times is not essential, such a system will operate entirely satisfactorily if the angular positions of the output shafts are occasionally checked and if necessary, the output shafts realigned manually.

However, scanning discs must be perfectly aligned at all times during operation, and it is the object of my present invention to provide means for automatically obtaining such alignment of the output shafts of the gear reduction units.

In my copending application Serial No. 590,820, filed April 28, 1945, there is disclosed suitable systems for accomplishing this general purpose. In one of the systems there shown each motor is operated independently of the others until its output shaft is properly aligned, whereupon that motor is stopped. When all of the output shafts have been aligned in this manner, the motors are started and accelerated and run in synchronism. In another system there shown, all of the motors except one are run independently until their respective output shafts are aligned and are then stopped. The remaining motor, which is assumed to carry a greater inertia load than the others, is also run independently, but when its output shaft is properly aligned it is not stopped, but the other motors are then started. In this manner, the motor which carries the heavier load does not have to start from a standstill and hence, it is better able to remain in synchronism with the other motors during the accelerating period. With this last mentioned system, however, it is possible to continue the rotation of only one motor, and hence if two or more motors carried heavier inertia loads then the remaining motors, difficulty might be experienced in starting them in synchronism.

In accordance with the present invention all of the motors are started substantially simultaneously but are operated independently of each other until the output shafts of the gear units of two of them become properly aligned whereupon those two motors are tied together for synchronous operation without stopping either of them. Thereafter, the remaining motor or motors operate independently until their output shafts become properly aligned with the output shafts of the two synchronously operating motors, whereupon these remaining motors are tied in for synchronous operation with the others.

Further objects of my invention may be apparent from the following description considered in connection with the accompanying drawing of which;

Figures 1, 2:
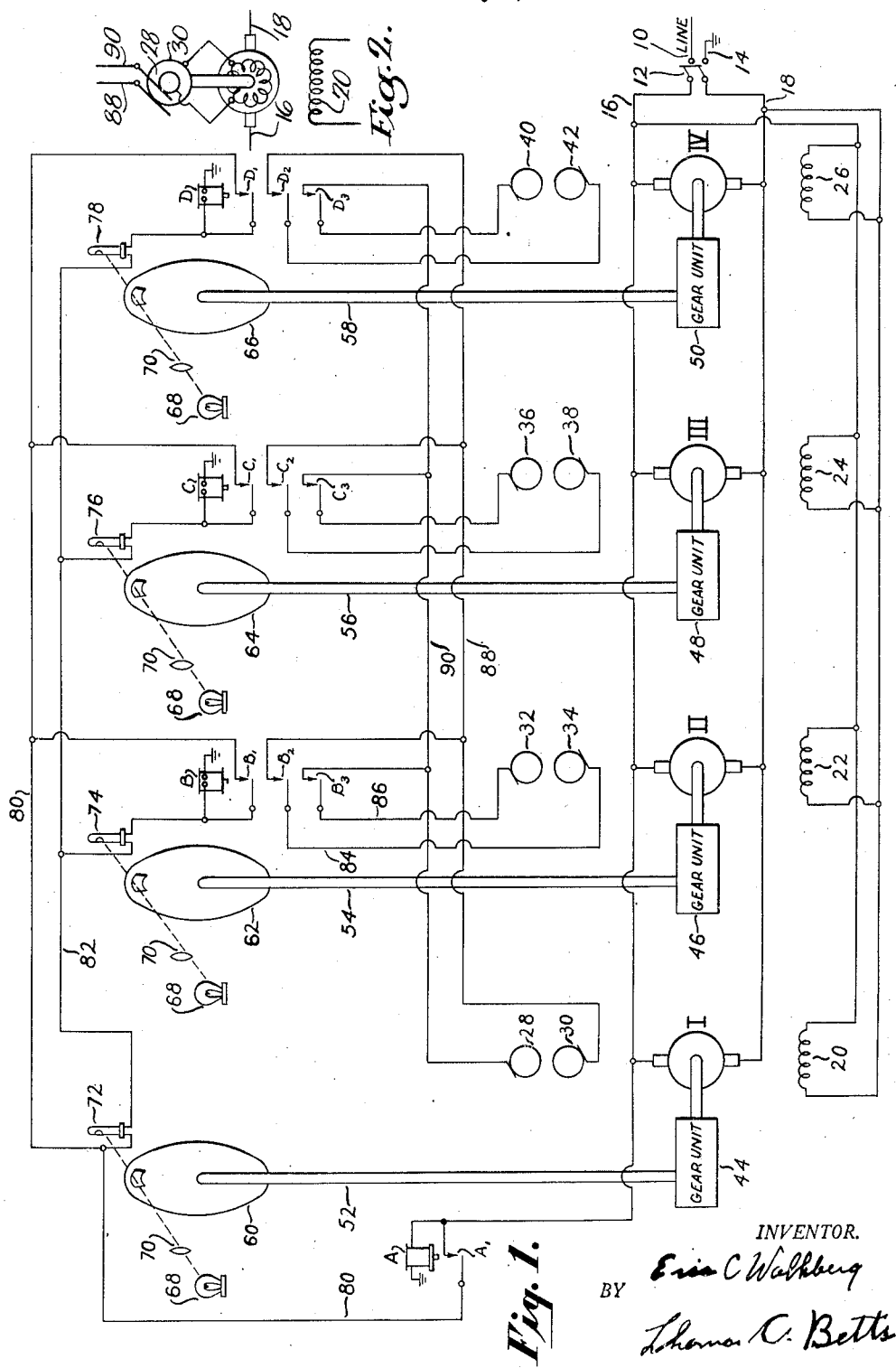
Fig. 1 is a wiring diagram showing a preferred embodiment of my invention.
Fig. 2 is a diagrammatic view of one of the motors shown in Fig. 1.

Referring to the drawing, reference character 10 designates a conductor which is connected to one side of any suitable supply of electrical current, the other side of which supply is assumed to be grounded. Conductor 10 is connected to one pole of a double pole, single throw switch 12, the other pole of which is grounded through conductor 14. The conductors 16 and 18 are connected to switch 12 and the armature brushes of a plurality of electric motors I, II, III, and IV are connected in parallel across the conductors 16 and 18. Field windings 20, 22, 24, and 26 of these motors are likewise connected in parallel across the conductors 16 and 18. These motors also include pairs of slip rings 28 and 30, 32 and 34, 36 and 38, and 40 and 42, respectively, each pair of slip rings being connected to spaced points in the armature winding, in the manner more particularly shown in Fig. 2 and also disclosed in my aforesaid Patent No. 2,399,273.

Each of the motors drives a gear reduction unit 44, 46, 48, and 50, respectively, having output shafts 52, 54, 56, and 58. Each of these shafts may be arranged to drive, at a speed which is greatly reduced with respect to the speed of the armature, a scanning disc or other mechanism (not shown) of a radar or television system. In addition, the shafts drive discs 60, 62, 64 and 66, respectively, each disc being formed with relatively small aperture near its periphery. Arranged on one side of each disc is light source 68 and lens system 70 which focuses a beam of light on the disc so that it will penetrate the opening when the disc is in a certain position of rotation. On the opposite side of the discs are photo-electric cells 72, 74, 76, and 78, each of which is so located that it will be illuminated by the beam of light which shines through the opening in the respective disc.

The solenoid of a delayed closing relay A is connected between the conductor 16 and ground. The normally open contact $A_1$ of this relay is connected between the conductor 16 and a conductor 80 which leads to one terminal of the photo-electric cell 72. The opposite terminal of this cell is connected by means of a conductor 82 with one terminal of each of the remaining cells 74, 76, and 78.

The solenoid of a magnetic relay B is connected between the other terminal of cell 74 and ground. This relay has three normally open contacts $B_1$, $B_2$, and $B_3$. Contact $B_1$ is connected between the conductor 80 and the solenoid of the B relay so as to provide a holding circuit. Contacts $B_2$ and $B_3$ are connected between conductors 84 and 86 leading from slip rings 34 and 32 and the conductors 88 and 90 which are connected to slip rings 30 and 28. A relay C is similarly connected with respect to photo-electric cell 76, the contact $C_1$ providing a holding circuit for this relay and the contact $C_2$ and $C_3$ being provided between slip rings 38 and 36 and conductors 88 and 90. In the same manner a relay D is connected with cell 78, the contact $D_1$ providing a holding circuit and contacts $D_2$ and $D_3$ establishing a connection between the slip rings 42 and 40 and the conductors 88 and 90.

The above-described device operates as follows:

Closure of the switch 12 supplies electric power to the armatures and fields of the motors I, II, III, and IV, and consequently these motors start to operate. Inasmuch as the contacts $B_2$, $B_3$, $C_2$, $C_3$, $D_2$, and $D_3$ are all open, the slip rings of the several motors are not connected together and hence, the motors do not operate in synchronism but run independently of each other. Although they may be similar motors, they will not run at exactly the same speeds due to various factors such as different frictional losses in their bearings and their respective gear reduction units, different resistances of the motor windings due to different rates of heating and different loads.

The relay A is adjusted to close at a time sufficiently long after the switch 12 to permit all of the motors to come up to their respective full speeds when running independently. Closing of contact $A_1$ completes the line circuit as far as the photo-electric cell 72. Once during each revolution of the disc 60 the aperture comes into alignment with the beam of light from the lens 70, thus illuminating the cell 72 and activating it so as to permit the passage of current from the conductor 80 to the conductor 82. If at this instant none of the apertures in the other discs is in line with the light beams, none of the relays B, C, or D is energized and the motors continue to operate independently. However, sooner or later due to the slightly different speeds at which the motors are running, the aperture in one of the discs 62, 64, or 66 will line up with its light beam at the same instant that the apperture in disc 60 is so aligned. Assuming that the apertures is discs 60 and 64 are both aligned in this manner at the same instant, both the cells 72 and 76 will be activated and current from conductor 80 will pass through the cell 72 to conductor 82 and through the cell 76 to energize relay C. The closing of contact $C_1$ provides a holding circuit for this relay so that it will remain energized when the circuit through the photo-electric cells is broken by the continued rotation of the discs. Closing of contacts $C_2$ and $C_3$ connects the slip rings 38 and 36 of motor III with slip rings 30 and 28 of motor I, and consequently, these two motors now operate in synchronism with each other, as explained in my aforesaid patents, and hence the output shafts 52 and 56 rotate at the same speed and in the same angular phase relationship.

Motors II and IV continue to run independently until the aperture in either disc 62 or 66 permits the passage of light to the cells 74 or 78, respectively, at the same instant that the aperture in disc 60 permits the passage of light to the cell 72. When this occurs either the relay B or D is energized and motor II or IV is synchronously tied in with motors I and III. The remaining motor then continues to operate independently until the light beam through the aperture in its disc is completed at the same time as the light beam is completed through the disc 60.

Obviously, two or even more of the motors might be synchronized at the same instant. In other words, should it occur that, after the closure of the relay A the apertures in all the discs should permit the passage of light to the respective cells at the same instant, all of the relays B, C, and D would be energized simultaneously, thus tying all of the motors together for synchronous operations.

In order to shut down the system it is merely necessary to open the switch 12, whereupon the electric power to the motors is discontinued and all of the relays are deenergized, thus returning the system to the condition shown in the wiring diagram.

It will thus be seen that, due to the fact that all of the motors are brought up to full speed before they are synchronized with each other, there is ample time for any of the motors which are carrying greater inertia loads than the others to come up to this speed and hence no difficulty is experienced in getting the several motors to operate in synchronism.

While I have shown photo-electric cells in co-operation with apertured discs, these are merely illustrative of any suitable rotary switch, and obviously could be replaced by the mechanical rotary switches of the general type shown in my copending application Serial No. 590,820. While I have shown a more or less specific embodiment of my invention it is to be understood that this has been done for purposes of illustration only and that the scope of my invention is not to be limited thereto, but is to be determined from the appended claims.

What I claim is:

1. In an electrical system, a plurality of electric motors, a gear reduction unit driven by each motor, each unit having an output shaft, a source of electric current, means for connecting said motors to said source to cause the motors to start substantially simultaneously and rotate independently of each other, and means responsive to the simultaneous turning of two or more of said output shafts to predetermined angular positions to cause the motors driving the respective shafts to continue to rotate in synchronism with each other.

2. In an electrical system, a plurality of electric motors, one of said motors being a pilot motor, a gear reduction unit driven by each motor, each unit having an output shaft, a source of electric current, means for connecting said motors to said source to cause the motors to start substantially simultaneously and rotate independently of each other, and means responsive to the simultaneous turning of the output shaft driven by said pilot motor and the output shaft driven by one of the other motors to predetermined angular positions to cause these two motors to continue to rotate in synchronism with each other.

3. In an electrical system, a plurality of electric motors, a gear reduction unit driven by each motor, each unit having an output shaft, a source of electric current, means for connecting said motors to said source to cause the motors to start substantially simultaneously and to rotate independently of each other, a synchronizing circuit for causing said motors to rotate in synchronism with each other, and means responsive to the simultaneous turning of two or more of said output shafts to predetermined positions to connect the motors driving the respective shafts to said circuit for causing them to continue to rotate in synchronism with each other.

4. In an electrical system, a plurality of electric motors, one of said motors being a pilot motor, a gear reduction unit driven by each motor, each unit having an output shaft, a source of electric current, means for connecting said motors to said source to cause the motors to start substantially simultaneously and rotate independently of each other, a synchronizing circuit for causing said motors to rotate in synchronism with each other, said pilot motor being permanently connected to said circuit, rotary switching means driven by each of said output shafts, the switching means driven by the output shaft associated with said pilot motor being connected in series with each of the other switching means, a relay connected to each of said other switching means so that each relay is actuated by the simultaneous closing of the circuit through the switching means of the pilot motor and the switching means to which that relay is connected, and conductors connecting the motors other than the pilot motor to said synchronizing circuit through the respective relays.

5. In an electrical system, a plurality of electric motors, a gear reduction unit driven by each motor, each unit having an output shaft, a source of electric current, means for connecting said motors to said source to cause the motors to start substantially simultaneously and to rotate independently of each other, and means for synchronizing all of the motors with respect to each other during their rotation and without stopping any of them.

6. In an electrical system, a plurality of electric motors, a gear reduction unit driven by each motor, each unit having an output shaft, a source of electric current, means for connecting said motors to said source to cause the motors to start substantially simultaneously and to come up to substantially full speed independently of each other, means for synchronizing all of the motors with respect to each other during their rotation at substantially full speed and without stopping any of them, and means for preventing the synchronizing of any of said motors before they have attained substantially full speed.

ERIC C. WAHLBERG.

REFERENCES CITED

The following references are of record in the file of this patent:

UNITED STATES PATENTS

| Number | Name | Date |
| --- | --- | --- |
| 2,239,244 | Nelson | Apr. 22, 1941 |

FOREIGN PATENTS

| Number | Country | Date |
| --- | --- | --- |
| 404,047 | Great Britain | Jan. 11, 1934 |